(12) United States Patent
Drieghe et al.

(10) Patent No.: US 9,168,684 B2
(45) Date of Patent: Oct. 27, 2015

(54) METHOD OF MAKING AN ELASTOMERIC SKIN AND SKIN OBTAINED BY THAT METHOD

(75) Inventors: Geert Drieghe, Appelterre Eichern (Ninove) (BE); Jan De Moor, Oordegem (BE); Mario Genetello, Oosterzele (BE); Yvan Vanluchene, Waregem (BE)

(73) Assignee: RECTICEL AUTOMOBILSYSTEME GMBH, Rheinbreitbach (DE)

( * ) Notice: Subject to any disclaimer, the term of this patent is extended or adjusted under 35 U.S.C. 154(b) by 798 days.

(21) Appl. No.: 13/381,851

(22) PCT Filed: Jul. 2, 2010

(86) PCT No.: PCT/EP2010/059501
§ 371 (c)(1),
(2), (4) Date: Dec. 30, 2011

(87) PCT Pub. No.: WO2011/000957
PCT Pub. Date: Jan. 6, 2011

(65) Prior Publication Data
US 2012/0114954 A1  May 10, 2012

(30) Foreign Application Priority Data

Jul. 2, 2009  (EP) .................................... 09164431

(51) Int. Cl.
*B29C 41/22* (2006.01)
*B29C 41/08* (2006.01)
(Continued)

(52) U.S. Cl.
CPC ................. *B29C 41/08* (2013.01); *B29C 41/22* (2013.01); *B29C 41/32* (2013.01); *B29K 2027/06* (2013.01);*B29K 2075/00* (2013.01); *B29L 2031/3005* (2013.01); *B29L 2031/3008* (2013.01); *Y10T 428/31554* (2015.04)

(58) Field of Classification Search
CPC .... B29C 39/025; B29C 39/146; B29C 41/22; B29C 41/32; B29C 39/14; B29L 2031/3008; B29L 2031/3005
USPC .............. 264/309, 245, 246, 261, 171.1, 214, 264/255
See application file for complete search history.

(56) References Cited

U.S. PATENT DOCUMENTS 5,071,683 A * 12/1991 Verwilst et al. ................ 427/420
6,013,210 A * 1/2000 Gardner, Jr. .................. 264/40.1
(Continued)

FOREIGN PATENT DOCUMENTS

EP 0 804 327 A  11/1997
EP 1 724 085 A1  11/2006
(Continued)

OTHER PUBLICATIONS
13381851 JPH02178009 Abstract.*

*Primary Examiner* — Joseph S Del Sole
*Assistant Examiner* — Lawrence D Hohenbrink, Jr.
(74) *Attorney, Agent, or Firm* — Sughrue Mion, PLLC

(57) ABSTRACT

The present invention relates to a method of making an elastomeric skin (1) wherein droplets of at least one first skin forming composition (2) are applied onto a mould surface to form a layer of the first skin forming composition thereon and wherein one or more second skin forming compositions (4) are applied at least partially onto the back of the layer of said first skin forming composition (2) to produce the skin (1). In order to obtain a special visual appearance when using of differently colored first and second skin forming materials, or in order to reduce the effect of the first skin forming composition (2) on the overall physical properties of the skin (1), the droplets of the first skin forming composition (2) are applied onto the mould surface and are allowed to coalesce to form a non-continuous layer of the first skin forming composition which comprises a plurality of gaps (3). The second skin forming compositions (4) are applied not only on the back of the first skin forming composition (2) but also in these gaps (3). The first skin forming composition preferably forms islands on the mould surface which are interconnected by means of the second skin forming compositions.

20 Claims, 1 Drawing Sheet

Figure 1:
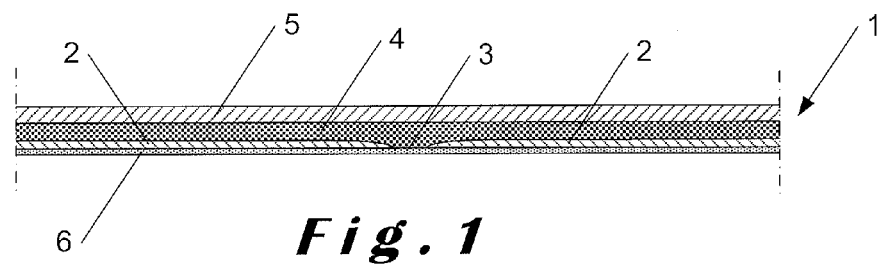

(51) Int. Cl.
 *B29C 41/32* (2006.01)
 *B29L 31/30* (2006.01)
 *B29K 27/06* (2006.01)
 *B29K 75/00* (2006.01)

(56) References Cited

U.S. PATENT DOCUMENTS 6,150,009 A * 11/2000 Stecker .................. 428/198

2008/0191383 A1 * 8/2008 Braeckman et al. .......... 264/245
2009/0324941 A1 * 12/2009 Benoit et al. .................. 428/339

FOREIGN PATENT DOCUMENTS

| JP | 63-188009 A | | 8/1988 |
| JP | 02-141212 A | | 5/1990 |
| JP | 02-178009 A | | 7/1990 |
| JP | 02178009 A | * | 7/1990 |
| WO | WO 2007137623 A1 | * | 12/2007 |

* cited by examiner

METHOD OF MAKING AN ELASTOMERIC SKIN AND SKIN OBTAINED BY THAT METHOD

CROSS REFERENCE TO RELATED APPLICATIONS

This application is a National Stage of International Application No. PCT/EP2010/059501 filed Jul. 2, 2010, claiming priority based on European Patent Application No. 09164431.0 filed Jul. 2, 2009 the contents of all of which are incorporated herein by reference in their entireity.

The present invention relates to a method of making an elastomeric skin against a mould surface, wherein droplets of at least one first skin forming composition are applied onto said mould surface to form a layer of said first skin forming composition thereon; after having formed said layer of said first skin forming composition, one or more second skin forming compositions, at least one of which is different from said first skin forming composition, are applied at least partially onto the back of the layer of said first skin forming composition; said first and second skin forming compositions are solidified; and the produced elastomeric skin is removed from the mould surface. The first skin forming composition solidifies to produce a first skin material of the elastomeric skin while the one or more second skin forming compositions solidify to produce one or more second skin materials.

Elastomeric skins can be made of thermoplastic materials such as PVC (polyvinyl chloride) or TPU (thermoplastic polyurethane) or of thermosetting materials such as polyurethane. Such elastomeric skins are used in particular in interior trim parts of automotive vehicles, more particularly in instrument panels, door panels, consoles, glove compartment covers, etc. In such applications the elastomeric skin is adhered to a rigid substrate either directly but preferably indirectly through the intermediary of an intermediate backfoam layer. This backfoam layer has a density which is lower than 200 $kg/m^3$ and which is usually comprised between 120 and 180 $kg/m^3$. The presence of such a backfoam layer enables to indent the elastomeric skin resiliently so that a soft touch is provided to the trim part.

The use of two or more different skin forming compositions to produce an elastomeric skin is already known for a number of applications.

A first series of applications is based on liquid skin forming compositions which are sprayed onto the mould surface.

The first liquid skin forming composition can be sprayed over the entire mould surface to form the outer, visible front surface of the elastomeric skin. In this application, the first skin forming composition may be a paint which is applied as an in-mould-coating to provide a light-stable coloured coating layer. Since this coating layer covers the second elastomeric skin layer, this elastomeric skin layer doesn't have to be coloured and doesn't have to be light stable so that it may contain an aromatic polyurethane composition which is usually more reactive and more flexible than an aliphatic polyurethane composition. The elastomeric properties of the skin are mainly determined by this elastomeric polyurethane layer. As disclosed in WO 2007/137623 the first skin forming composition may however also be a polyurethane elastomer composition, forming together with the second skin forming composition, which is also a polyurethane elastomer composition, the elastomeric skin. The elastomeric properties of the skin are thus determined by both of these layers. Both elastomeric layers have different physical properties, in particular a different flexibility. By using a more flexible second elastomeric polyurethane material in combination with a first elastomeric polyurethane material, which is less flexible due to the fact that it has to be light stable, a composite skin can be produced which has a sufficiently high overall flexibility. A drawback of such a composite skin is that the first elastomeric material still has a relatively large effect on the overall physical properties of the composite skin, even when its layer thickness is reduced to a minimum.

As disclosed for example in EP 0804327 and EP 1724085, the first liquid skin forming composition can also be sprayed on a first area of the mould surface while another portion of the mould surface is covered by means of a mask and, after having removed the mask, the second liquid skin forming composition is sprayed onto the remaining area of the mould surface and partially onto the back of the layer of the first skin forming composition. Both skin forming compositions have a different colour so that a two-tone (or multi-tone) skin is obtained. The skin forming compositions may either be paint compositions or polyurethane elastomer compositions. At the transition between the two colours, a transition zone containing spots of both colours may be present, but this transition zone is hidden from view in a groove and has only a very small width of about 1 mm or less so that it can nearly not be seen.

A two-tone or multi-tone skin can also be produced by means of thermoplastic skin forming compositions. As disclosed in WO 2006/060970 and in EP 1 772 247 a powder of a thermoplastic skin forming composition can be sprayed electrostatically onto a mould surface which is heated so that the powder particles melt and create via sintering a thermoplastic layer. By successively spraying differently coloured thermoplastic powders onto different areas of the mould surface, a two or multi-tone elastomeric skin can be produced.

In order to obtain a skin with a variegated appearance, a mixture of thermoplastic particles having a different colour can be used. Upon heating, the mixed powder particles can be allowed to randomly flow at the particles margins to form two or more shade tones as disclosed for example in EP 0 176 274. Other patent publications such as EP 1 240 990 disclose techniques for preventing the colours of the different particles to be mixed at the borders of the particles. In EP 1 204 990 this is achieved by keeping at least one of the two particle types in a highly viscous state when fusing the particles together. A drawback of these prior art methods is that the pattern of the different colours on the skin is mainly determined by the size of the different particles. In this respect, EP 1 204 990 teaches not only the use of a powdery material, which is most common for slush moulding applications, but also the use of a floccular material. The smaller particles fuse however not only laterally to the larger flocks but also to the front side thereof. When the differently coloured particles are of a same size, the patterns formed by the different colours are moreover very similar. A further drawback of the use of larger particles is that they require a larger minimum thickness of the skin.

Instead of applying a mixture of thermoplastic particles onto the mould surface, JP 63188009 discloses to deposit a first thermoplastic material in the form of spots on the surface of a mould. This mould is heated to a temperature which reaches almost the melting temperature of the first thermoplastic material so that the spots of this first thermoplastic material adhere to the mould surface. Subsequently, a layer of a second thermoplastic material is moulded by a rotation moulding process against the mould surface and against the back of the spots of the first thermoplastic material. A skin material showing a marble pattern is thus obtained. Due to the fact that both materials are not mixed, the same clear marble pattern can be achieved during the successive mouldings. A drawback of this process is however that the shape of the spots is again mainly determined by the size and the shape of the thermoplastic particles applied onto the mould surface. JP 02141212 and JP 02178009 disclose similar processes wherein a first thermoplastic material is first applied in a spotted pattern onto a heated mould surface after which a layer of a second thermoplastic material is moulded against the back of the spots of first thermoplastic material. In none of these known thermoplastic processes, the first thermoplastic material is applied in the form of droplets onto the mould surface.

An object of the present invention is to provide a new method wherein the first skin forming composition has a reduced effect on one or more of the overall physical properties of the elastomeric skin compared to the skin wherein the first skin forming composition forms a continuous layer and/or wherein, when the first liquid skin forming composition has a colour tone different from the colour tone of said one or more second skin forming compositions, a different visual appearance is achieved compared to the above described two- or multi-tone skins and also compared to the above described skins with a variegated appearance obtained either by the use of a mixture of differently coloured thermoplastic particles or by applying first spots of the first thermoplastic material onto the mould surface.

To this end, the method according to the invention is characterised in that the droplets of said first skin forming composition are applied onto said mould surface, and at least a number of them are made to coalesce thereon, to form a non-continuous layer of the first skin forming composition onto said mould surface, which layer comprises, in a first area of said mould surface, a plurality of gaps wherein the mould surface is not covered with said first skin forming composition, said one or more second skin forming compositions being applied in said gaps to cover the mould surface at the location of said gaps substantially completely with said second skin forming compositions, said first area of the mould surface having such a large width that it can be divided in squares of at least 2 $cm^2$.

The first skin forming composition is either applied directly against the mould surface or onto one or more layers which have been applied previously against the mould surface, for example a layer of a release agent and/or a layer of an in-mould coating (which adheres to the first skin material). The second skin forming composition or compositions comprise the skin forming compositions which are applied in said gaps so that they also contact either the mould surface directly or the layer against which the first skin forming composition is applied. When the first skin forming composition forms the visible front side of the elastomeric skin, or when it is covered with a translucent or transparent coating layer, the second skin materials are thus also visible on the front side of the elastomeric skin. In view of the quite large minimum width of the first area of the mould surface wherein the layer of first skin forming composition shows a plurality of gaps (i.e. a minimum width of at least about 1.5 mm since this first area has to be dividable in squares of at least 2 $cm^2$), the composite nature of the skin can clearly be seen.

Due to the fact that the first skin forming composition is applied in the method according to the invention in the form of a non-continuous layer, the physical properties of the first skin material in the hardened skin will have less effect on the overall physical properties of the elastomeric skin since the layer of first skin material is interrupted and backed by the second skin material(s). Moreover, the first skin forming composition doesn't have to be applied uniformly onto the mould surface in said first area thereof, but it can be varied so that its effect on the overall physical properties of the elastomeric skin also varies from location to location. A further difference with the prior art methods which use a mixture of thermoplastic powders, is that the first skin forming composition is not mixed with the second skin forming composition or compositions so that it does not affect the physical properties of the second skin materials. All this is especially important when the first skin material is an elastomeric material which determines, together with any further elastomeric skin layers, the physical properties of the elastomeric skin.

When the first skin material is visible from the front side of the elastomeric skin, and has a colour tone different from the colour tone of the second skin material, a special visual appearance is achieved which is different from the visual appearance which is achieved in the prior art methods with the use of a mixture of differently coloured thermoplastic powders. Indeed, in the method according to the present invention, the first skin forming composition is applied in the form of droplets on the mould surface which are allowed to coalesce to form a non-continuous layer before the second skin forming composition or compositions are applied onto this layer of first skin forming composition. The formation of this non-continuous layer is thus not disturbed by the presence of the second skin forming compositions. Moreover, due to the coalescing of the liquid droplets, the first skin forming composition forms a special pattern onto the mould surface, the edges of the first skin forming composition situated along the gaps in the non-continuous layer having for example not only convex but also concave portions. The gaps in the non-continuous layer form an irregular design.

In a preferred embodiment of the method according to the present invention, at least 10%, preferably at least 30% and more preferably at least 50% of the number of the droplets which are applied in said first area of the mould surface are made to coalesce in this first area on the mould surface.

In a further preferred embodiment of the method according to the present invention, the droplets of the first skin forming composition are applied in such a small amount on the mould surface that said non-continuous layer is composed of islands of the first skin forming composition, which islands are interconnected by means of said one or more second skin forming compositions.

Due to the coalescence of the droplets, the islands of the first skin forming composition are not just fairly circular splashes but are quite irregular having not only convex but also concave edge portions. Moreover, when enough first skin forming composition is sprayed onto the mould surface, it has been observed quite by surprise that the islands of the first skin material are separated by quite narrow and uniform lines (resembling veins) of the second skin material. In this way, it was possible to achieve in particular a leather-like vein pattern on the skin without having to print any pattern thereon. The method according to the present invention is thus much cheaper than a printing method as disclosed for example in US 2003/0020767 wherein a leather-like venation is printed by means of an inkjet printer onto a dashboard. It also enables to produce other patterns, for example by deforming the droplets by means of an air flow, by moving (f.e. rotating) the mould surface and/or by providing a relief onto the mould surface.

Another advantage of this preferred embodiment is that since the first skin material is present in the form of islands separated by the second skin material, the first skin material has even less effect on the final physical (elastomeric) properties of the elastomeric skin.

In an advantageous embodiment of the method according to the present invention, the droplets of said first skin forming composition are applied in such a large amount on the mould surface that the first skin forming composition covers at least 5%, preferably at least 15% and more preferably at least 30% of said first area of the mould surface.

Preferably, the droplets of said first skin forming composition are applied in such a small amount on the mould surface that the first skin forming composition covers less than 95%, preferably less than 90% and more preferably less than 85% of said first area of the mould surface.

The present invention also relates to an elastomeric skin obtained by the method according to the invention.

Figure 2:
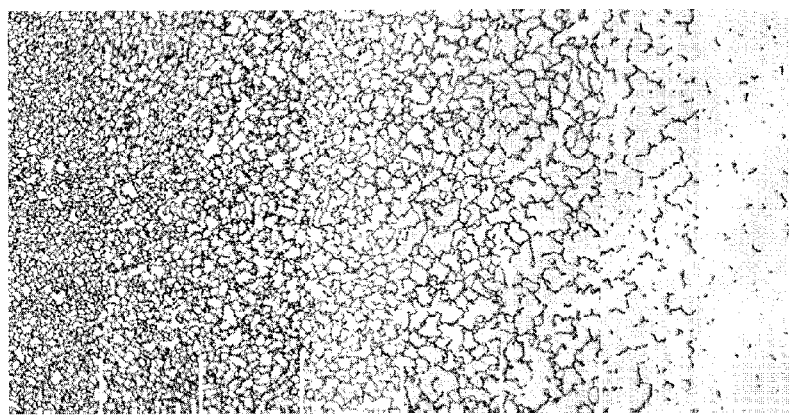
Figure 3:
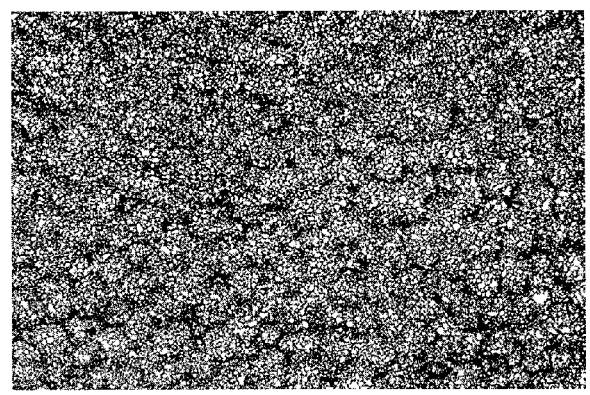

Other particularities and advantages of the invention will become apparent from the following description of some particular embodiments of the method and the elastomeric skin according to the present invention. The reference numerals used in this description relate to the annexed drawings wherein:

FIG. 1 shows a schematic cross-sectional view through the different layers applied in accordance with the present invention to produce an elastomeric skin;

FIG. 2 is a picture of the visible front surface of different elastomeric skins (strips of which have been put next to one another), the difference between the illustrated skins being the amount of the light-coloured first skin forming composition which is sprayed prior to the darker-coloured second skin forming composition onto the mould surface; and FIG. 3 is a picture of the visible front surface of another elastomeric skin wherein a special effect is obtained by covering the mould surface with a filter mat when spraying the first, light-coloured skin forming composition.

The present invention relates to a method of making an elastomeric skin 1 against a mould surface. This elastomeric skin 1 is a composite skin consisting of at least two layers and has generally an elongation, measured in accordance with DIN/EN/ISO 527-3, of at least 30%, preferably of at least 50%. Its flexural modulus, measured in accordance with ASTM D790-03, is preferably smaller than 40 MPa, and more preferably smaller than 35 MPa. Generally, its overall density is larger than 300 kg/m$^3$, preferably larger than 500 kg/m$^3$ and more preferably larger than 600 kg/m$^3$.

The elastomeric skin 1 is made by applying droplets of a first skin forming composition 2 onto the mould surface to form a non-continuous layer of this first skin forming composition thereon. In a first area of the mould surface, this non-continuous layer has a plurality of gaps 3 wherein the mould surface is not covered with the first skin forming composition 2. Next to this first area, the mould surface may be covered by a continuous layer of the first skin forming material or by one or more other skin forming compositions. Preferably, said first area comprises at least 5%, preferably at least 10%, more preferably at least 30% and most preferably at least 50% of the mould surface. Instead of applying droplets of one single first skin forming composition 2 onto the mould surface, it is also possible to apply simultaneously droplets of two or more first skin forming compositions 2 onto the mould surface. These skin forming compositions 2 are preferably liquid compositions which are sprayed simultaneously onto the mould surface.

Preferably, the droplets of said first skin forming composition are applied substantially uniformly onto said mould surface in said first area thereof so that when dividing said first area in squares of 4 cm$^2$, preferably of 2 cm$^2$, the coverage degree of the mould surface by said first skin forming material in each of said squares differs for each of said squares less than 30%, preferably less than 20% and more preferably less than 10%, from the average coverage degree of the first skin forming composition 2 in the area formed by the respective square and all the squares which are adjacent thereto. In this embodiment, said first area has to have a width so that it can be divided in squares of 4 cm$^2$, or at least in squares of 2 cm$^2$.

After having formed the non-continuous layer of the first skin forming composition 2 onto the mould surface, one or more second skin forming compositions 4 are applied in a next step onto the back of the non-continuous layer and in the gaps 3 therein to cover the mould surface at the location of these gaps substantially completely with the second skin forming composition or compositions 4.

The first skin forming composition 2 solidifies to produce a first skin material whilst the one or more second skin forming compositions 4 solidify to form one or more second skin materials. The first skin forming composition 2 does not need to be completely solidified before applying the second skin forming composition 4 onto the back thereof but is preferably at least partially solidified before the second skin forming composition 4 is applied thereon. After solidification of the different skin forming compositions 2 and 4, the produced elastomeric skin 1 can be removed from the mould surface.

In a preferred embodiment, the first skin forming composition 2 is a liquid skin forming composition which is sprayed in the form of droplets onto the mould surface. These droplets have preferably a medium volume diameter, determined according to ASTM E 799-81, which is larger than 5 µm, preferably larger than 20 µm, more preferably larger than 50 µm and most preferably larger than 80 µm but which is smaller than 3000 µm, preferably smaller than 1000 µm, more preferably smaller than 500 µm and most preferably smaller than 300 µm. The second skin forming composition 4 (or compositions) is also preferably a liquid skin forming composition. As well the liquid first skin forming composition 2 as the liquid second composition 4 can be a curable skin forming composition, i.e. a skin forming composition which solidifies by reacting, and is preferably a curable polyurethane skin forming composition, forming an elastomeric skin material after curing. When not covered by a paint layer, the first and/or the second skin material is preferably light-stable. Suitable polyurethane formulations, which can be sprayed onto the mould surface, are disclosed in EP-B-0 379 246. These formulations can be sprayed for example by the techniques described in EP-B-0 303 305 and in EP-B-0 389 014. They are substantially solvent-free or contain only a very limited amount of solvents, in particular less than 5 wt. % and more particularly less than 3 wt. %. The liquid second skin forming composition can be applied by spraying or pouring it onto the back of the non-continuous layer of first skin material, or be moulding it in accordance with a reaction injection moulding process (RIM). Suitable RIM formulations are disclosed in EP-B-0 929 586. They can be moulded for example by a RIM process as disclosed in WO 02/11974.

As well the first as second skin material preferably have an average density of at least 300 kg/m$^3$, more preferably an average density which is higher than 500 kg/m$^3$ and most preferably an average density which is higher than 600 kg/m$^3$.

Instead of using the above-described curable skin forming compositions, it is also possible to use liquid thermoplastic compositions for the first and/or the second skin materials to produce the elastomeric skin layers. An example hereof is a plastisol, preferably a PVC plastisol which is preferably in the form of an organosol. Such an organosol contains a resin (PVC) suspended in a plasticizer (i.e. a plastisol) diluted with diluents to reduce the viscosity so that it can be sprayed. On heating, this liquid is converted into a solid. In a first phase of the heating process, the diluents will evaporate and when reaching the gelation temperature a gel is formed. On further heating, a solution of polymer and plasticizer is formed with the formation of a homogenous plasticized PVC melt (which occurs at the fusion temperature). On cooling, solid plasticized PVC is obtained.

The first and/or second skin forming compositions 2, 4 may also be paints, i.e. compositions which solidify by evaporation of solvents (including organic solvents and water). The paint is preferably selected from the group of acrylic-based paint compositions, polyester-based paint compositions, polyurethane-based paint compositions and combinations thereof. The paint is preferably a water-based paint composition. A solidified paint layer has usually only a limited thickness, more particularly an average thickness of less than 100μ, whereas the other skin forming compositions, the solidification of which is not or not mainly based on the evaporation of solvents, produce elastomeric skin layers which are thicker, and which have more particularly generally an average thickness which is larger than 100μ. The average thicknesses are calculated by dividing the volume of the layer by the surface area thereof. When the layer is a non-continuous layer containing gaps, the surface area of these gaps is to be detracted from the total surface area of the non-continuous layer.

The elastomeric skin 1 preferably has a minimum average thickness larger than 0.1 mm, preferably larger than 0.3 mm and more preferably larger than 0.7 mm.

When this average thickness is not achieved by the first and second skin materials 2, 4, for example when these first and second materials are paint layers, a further elastomeric skin layer 5 can be applied onto the back of the first and second skin layers. This further elastomeric skin layer 5 can be made from the same skin forming compositions as described hereabove for the first and second skin layers, except for the paint compositions.

As described hereabove, the first skin forming composition 2 is the first applied skin forming composition which forms a non-continuous layer onto the mould surface. Prior to this first non-continuous layer, one or more other layers can be applied to the mould surface. It is in particular possible to apply an in-mould coating layer 6 to the mould surface which adheres to the first and the second skin materials 2 and 4. This in-mould coating layer 6 may be a paint layer protecting the first and second skin materials from UV radiation so that these materials do not have to be light stable. When made from polyurethane, they can thus be made from aromatic polyurethane compositions. On the other hand, the in-mould coating layer 6 may also be a translucent or transparent layer so that the front side of the first and second skin layers remains visible. This is especially of interest when the first and second skin layers are differently coloured providing a decorative design.

The in-mould coating layer 6 may for example also consist of individual particles, which may be sprayed in the form of a suspension onto the mould surface. The individual particles can modify the surface properties of the skin or they can also provide a special optical effect. They can comprise for example metal flakes, in particular aluminium flakes, providing a glittering effect.

An essential feature of the method is that the first skin forming material, which forms a non-continuous layer on the mould surface, is applied in the form of droplets thereon. This is in particular done by applying (more particularly by spraying) liquid droplets directly onto the mould surface.

The non-continuous layer may comprise individual droplets of the first skin forming composition but it comprises also larger portions which are obtained by coalescence of different droplets. In the area of the mould surface where the non-continuous layer of first skin forming material comprises a plurality of gaps, i.e. in the first area of the mould surface, preferably at least 10%, more preferably at least 30% and most preferably at least 50% of the number of these droplets are made to coalesce. Coalescence of the droplets produces an irregular pattern of the gaps 3 in the non-continuous layer.

Before applying the second skin forming composition or compositions 4, the first skin forming composition 2 is preferably at least partially solidified so that the gap pattern is substantially not disturbed by applying the second skin forming composition(s) 4 onto the back of the first skin forming composition 2.

Depending on the amount of first skin forming composition 2, different patterns can be produced. On the one hand the first skin forming composition 2 is preferably applied in such a large amount that it covers at least 5%, preferably at least 15% and more preferably at least 30% of the first area of the mould surface. On the other hand the first skin forming composition 2 is preferably applied in such a small amount that it covers less than 95%, preferably less than 90% and more preferably less than 85% of said first area of the mould surface.

The first skin forming composition 2 is preferably applied in such an amount that the non-continuous layer formed thereof comprises in said first area of the mould surface islands of first skin forming composition 2 which are interconnected by the second skin forming composition or compositions 4. The individual islands are those portions of the non-continuous layer which are entirely surrounded by the second skin forming composition or compositions. The islands have a total surface area, at least 50% of which is preferably formed by the islands having a size larger than 0.3 mm$^2$, preferably larger than 0.8 mm$^2$, more preferably larger than 1.2 mm$^2$ and most preferably larger than 2 mm$^2$. In other words the weighted average (weighted based on the surface area of the islands) of the surface area of the islands is preferably larger than these minimum sizes. The weighted average of the surface area of the islands is further preferably smaller than 100 mm$^2$, more preferably smaller than 50 mm$^2$ and most preferably smaller than 25 mm$^2$.

An advantage of the formation of such islands is that the first skin material has less effect on the final mechanical properties of the elastomeric skin. The first skin material may thus for example comprise a less flexible, harder material for example to improve the abrasion properties of the skin. On the other hand, it may also comprise a much softer material, for example even a foam material (having in particular a density lower than 400 kg/m$^3$), to improve the touch of the elastomeric skin. When the first skin material has a colour tone different from the colour tone of the second skin material or materials, a special aesthetic pattern is achieved, especially when such an amount of first skin material is applied onto the mould surface that the islands are separated by lines of second skin material which have a quite uniform width.

The design obtained by the differently coloured first and second skin forming compositions can additionally be influenced by providing a relief, for example grooves or ribs, onto the mould surface so that the droplets flow out in one direction or also by generating for example an air flow to modify the shape of the droplets onto the mould surface. It is for example possible to provide the mould surface with the relief of a woven structure. It has been observed that the droplets or islands automatically elongate in the longitudinal direction of the threads which are simulated by the relief on the mould surface, thus achieving a good imitation of the woven structure.

EXAMPLE 1

A series of elastomeric skin samples was produced according to the invention by spraying a beige-coloured first skin forming composition on a mould surface, followed by spraying a black-coloured second skin forming composition on the back of the first skin forming composition. Both skin forming compositions were polyurethane formulations composed by mixing a polyol component, having a viscosity of about 1080 mPa·s at 25° C. with an isocyanate component having a viscosity of about 1140 mPa·s at 25° C. Prior to spraying the first skin forming composition, the mould surface was treated with a release agent. The different skin samples were prepared by varying the amount of the first polyurethane formulation, sprayed pro mm2 of the mould surface. As presented in Table 1, this was done by changing the robot velocity, the spray distance and the output rate (g/s). The results of the visible front surface of the produced elastomeric skins (strips of which have been put next to one another) are presented in FIG. 1.

The higher spray distance in sample B versus sample A results in a less covering of the mould surface with the beige colour. In sample C the coverage of the mould surface with the beige colour is further reduced by the higher robot velocity. In sample D a wetting agent was added to the beige-coloured polyurethane formulation, whilst all other parameters remained constant. It can be clearly seen that this results in the formation of islands of the beige-coloured skin, which are surrounded by the black-coloured second layer. Similar effects can be reached by changing the surface tension of the mould surface, for instance by changing the mould material, by using coating layers or by applying a release agent. The higher robot velocity in sample E further reduces the sprayed amount of the beige-coloured skin layer, resulting in less drops which can coalesce. This results in beige-coloured islands, 50% of the total surface thereof is formed by islands having a surface larger than 5 mm². Further reducing the output rate in sample F and G reduces even more the number of beige-coloured drops that will coalesce, leading to even smaller islands. In sample H another nozzle was used which allows to spray smaller droplets. This resulted in a still further reduction of the formed islands of the beige colour.

TABLE 1

| Sample | Robot velocity (mm/sec) | Nozzle height to surface (mm) | Output (gr/sec) | Additional wetting agent | Average diameter spray droplets (μm) | % coverage first layer | island surface area 50% covering (mm²) |
| --- | --- | --- | --- | --- | --- | --- | --- |
| A | 1000 | 30 | 14 | Yes | 160 | 95 | |
| B | 1000 | 60 | 14 | Yes | 160 | | |
| C | 1300 | 60 | 14 | Yes | 160 | | |
| D | 1300 | 60 | 14 | No | 160 | | 20 |
| E | 2000 | 60 | 14 | No | 160 | 75 | 5 |
| F | 2000 | 60 | 12 | No | 160 | | |
| G | 2000 | 40 | 10 | No | 160 | | |
| H | 2000 | 60 | 10 | No | 100 | 65 | 1 |

EXAMPLE 2

In addition to example 1 an open-cell polyurethane filter mat of 15 mm thickness with a mesh of about 8 mm was positioned at a distance of 2 to 5 mm above the mould surface before spraying the first beige-coloured polyurethane composition. After spraying this first layer the filter mat was taken away and the black-coloured second polyurethane composition was sprayed. A picture of the produced sample is presented in FIG. 2. It can be clearly seen that the filter mat functions as a kind of mask generating an extra pattern on the visible (front) surface of the produced elastomeric skin.

The invention claimed is:

1. A method of making an elastomeric skin (1) against a mould surface, wherein:
   droplets of at least one first skin forming composition (2) are applied onto said mould surface to form a layer of said first skin forming composition (2) thereon;
   after having formed said layer of said first skin forming composition (2), one or more second skin forming compositions (4), at least one of which is different from said first skin forming composition (2), are applied at least partially onto the back of the layer of said first skin forming composition (2);
   said first and second skin forming compositions (2 and 4) are solidified, the first skin forming composition (2) producing a first skin material and the second skin forming compositions (4) producing one or more second skin materials backing the first skin material; and
   the produced elastomeric skin (1) comprising the first and second skin materials is removed from the mould surface,
   characterised in that
   the droplets of said first skin forming composition (2) are applied onto said mould surface, and at least a number of them are made to coalesce thereon, to form a non-continuous layer of the first skin forming composition (2) onto said mould surface, which layer comprises, in a first area of said mould surface, a plurality of gaps (3) wherein the mould surface is not covered with said first skin forming composition (2), said one or more second skin forming compositions (4) being applied in said gaps (3) to cover the mould surface at the location of said gaps (3) substantially completely with said second skin forming compositions (4), and are solidified in said gaps (3) to fill said gaps substantially completely with said second skin materials, and said first area of the mould surface has such a large width that it can be divided in squares of at least 2 cm².

2. A method according to claim 1, characterised in that at least 10% of the number of the droplets which are applied in said first area of the mould surface are made to coalesce in said first area on the mould surface.

3. A method according to claim 1, characterised in that said non-continuous layer is composed in said first area of the mould surface of islands of first skin forming composition (2), which islands are interconnected by means of said one or more second skin forming compositions (4).

4. A method according to claim 3, characterised in that said islands have a total surface area, at least 50% of which is formed by islands having a size larger than 0.3 mm².

5. A method according to claim 1, characterised in that the droplets of said first skin forming composition (2) are applied in such a large amount on the mould surface that the first skin forming composition (2) covers at least 5% of said first area of the mould surface.

6. A method according to claim 1, characterised in that the droplets of said first skin forming composition (2) are applied in such a small amount on the mould surface that the first skin forming composition (2) covers less than 95% of said first area of the mould surface.

7. A method according to claim 1, characterised in that said first skin forming composition (2) is a liquid skin forming composition which is sprayed in the form of said droplets onto the mould surface, said droplets having a medium volume diameter, determined according to ASTM E 799-81, which is larger than 20 µm, but which is smaller than 3000 µm.

8. A method according to claim 1, characterised in that said first skin forming composition (2) is solidified by reacting.

9. A method according to claim 1, characterised in that said first skin forming composition (2) is solidified by evaporation of one or more solvents.

10. A method according to claim 1, characterised in that said first skin forming composition (2) is solidified by fusing.

11. A method according to claim 1, characterised in that said one or more second skin forming compositions (4) comprise at least one liquid skin forming composition.

12. A method according to claim 1, characterised in that said first skin forming composition (2) is solidified at least partially before applying said one or more second skin forming compositions (4) onto the back thereof.

13. A method according to claim 1, characterised in that said first and second skin forming compositions (2, 4) are applied in such an amount on the mould surface that the skin layers formed from these first and second skin forming compositions have in said first area a total average thickness larger than a minimum average thickness which is equal to 0.1 mm or, when said total average thickness is smaller than said minimum average thickness, at least one further skin forming composition (5) is applied in said first area of the mould surface on the back of the skin layers formed by the first and second skin forming compositions (2, 4) so that the skin layers formed from said first, second and further skin forming compositions (2, 4, 5) have in said first area a total average thickness larger than said minimum average thickness.

14. A method according to claim 1, characterised in that the first skin forming composition (2) is of a first colour tone and at least one of said one or more second skin forming compositions (4) is of a second colour tone, which is different from the first colour tone.

15. A method according to claim 1, characterised in that, before having applied said droplets of said first skin forming composition (2) onto the mould surface, an in-mould-coating layer (6) is applied onto at least said first area of said mould surface, said first skin material adhering to said in-mould-coating layer.

16. A method according to claim 1, characterised in that the droplets of said first skin forming composition (2) are applied substantially uniformly onto said mould surface in said first area thereof so that when dividing said first area in squares of 4 cm$^2$, the coverage degree of the mould surface by said first skin forming composition (2) in each of said squares differs for each of said squares less than 30% of the average coverage degree of the first skin forming composition (2) in the area formed by the respective square and all the squares which are adjacent thereto from said average coverage degree.

17. A method according to claim 1, characterised in that said first area comprises at least 5% of said mould surface.

18. A method according to claim 4, characterised in that said islands have a total surface area, at least 50% of which is formed by islands having a size larger than 0.8 mm$^2$.

19. A method according to claim 7, characterised in that said droplets have a medium volume diameter, determined according to ASTM E 799-81, which is larger than 50 µm.

20. A method according to claim 19, characterised in that said droplets have a medium volume diameter, determined according to ASTM E 799-81, which is larger than 80 µm.

\* \* \* \* \*